US012799784B2

(12) United States Patent
Ott et al.

(10) Patent No.: US 12,799,784 B2
(45) Date of Patent: Nov. 17, 2026

(54) LEVER ACTUATED LATCH ASSEMBLY

(71) Applicant: Deere & Company, Moline, IL (US)

(72) Inventors: Cory A. Ott, Dubuque, IA (US); Nicholas P. Borkovec, Lancaster, WI (US)

(73) Assignee: Deere & Company, Moline, IL (US)

(*) Notice: Subject to any disclaimer, the term of this patent is extended or adjusted under 35 U.S.C. 154(b) by 269 days.

(21) Appl. No.: 18/663,707

(22) Filed: May 14, 2024

(65) Prior Publication Data

US 2025/0354417 A1 Nov. 20, 2025

(51) Int. Cl.

| | |
|---|---|
| ***E05B 85/26*** | (2014.01) |
| ***E02F 9/16*** | (2006.01) |
| ***E05B 83/00*** | (2014.01) |
| ***E05B 85/24*** | (2014.01) |

(52) U.S. Cl.

CPC .............. *E05B 85/26* (2013.01); *E02F 9/163* (2013.01); *E05B 83/00* (2013.01); *E05B 85/243* (2013.01)

(58) Field of Classification Search

CPC ........ E05B 83/00; E05B 83/42; E05B 85/243; E05B 85/26

USPC ...................................................... 296/190.1

See application file for complete search history.

(56) References Cited

U.S. PATENT DOCUMENTS

| | | | | |
|---|---|---|---|---|
| 4,875,724 A | 10/1989 | Gruber | | |
| 6,048,002 A * | 4/2000 | Ohta | E05B 81/20 | 292/216 |
| 2009/0026803 A1* | 1/2009 | Yano | B62D 33/0617 | 296/190.08 |
| 2009/0236865 A1 | 9/2009 | Dziurdzia et al. | | |
| 2012/0204589 A1* | 8/2012 | Krellner | E21F 13/025 | 165/41 |

FOREIGN PATENT DOCUMENTS

| | | | |
|---|---|---|---|
| DE | 60215252 T2 * | 8/2007 | E05B 83/16 |

OTHER PUBLICATIONS

Rogers et al., German Patent No. DE 60212252T2, English translation dated 2026. (Year: 2007).*

German Search Report issued in application No. 202025104894.0 dated Nov. 10, 2025, 14 pages.

* cited by examiner

*Primary Examiner* — Caroline N Butcher

(74) *Attorney, Agent, or Firm* — Andrew T. Ball; Lucian Wayne Beavers; Patterson Intellectual Property Law, PC

(57) ABSTRACT

Latch assemblies are configured to releasably attach to a locking pin. The latch assemblies may, for example, be used to secure an adjustable window, such as may be used in a work vehicle, either in a deployed position or an undeployed position. Particularly, the latch assemblies may be released by a single user action, such as by pulling on a release lever. The latch assemblies may also include one or more features to improve the guidance of the locking pin into the latching assembly, and in some examples, to provide a backup or failsafe latch to prevent accidental disengagement of the latch assembly.

20 Claims, 14 Drawing Sheets

LEVER ACTUATED LATCH ASSEMBLY

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD

The present disclosure relates to latch devices, and particularly for latch devices for securing the window of a vehicle or more particularly an excavator.

BACKGROUND

Manned work vehicles generally include an operator cab that accommodates the operator and contains the necessary controls for the operation of the work vehicle. In some cases, the work vehicle may include an adjustable window. Such adjustable windows can be deployed in a forward position that closes off the front portion of the operator cab, thus protecting the operator from debris, wind, precipitation, and other undesirable factors. When such protection is not desired, the window can be retracted into a raised and/or rearward position that leaves the front portion of the operator cab open. This can offer the operator several advantages when there is no need to have the window deployed, and can extend window longevity, by utilizing it only when it is needed.

However, such window configurations can suffer from several drawbacks. For example, such windows are generally designed to releasably attach to a static feature within the operator cab, usually at two or more points, and it may be difficult to correctly align the components of the window, and particularly the window frame, with the fixed features of the operator cab. This can lead to a "false positive" engagement where it may appear that the window has been securely attached to the static feature, but in fact, one or more components is misaligned for secure attachment. In turn, this can cause the window to slip out of its desired deployed or undeployed position while the vehicle is in operation.

Furthermore, existing devices for attaching the window to the static feature within the operator cab can be difficult and/or cumbersome to disengage, requiring a user to manipulate multiple various components to disengage the latch. This may make the repositioning of the window time consuming and difficult.

There is, therefore, a need for latches and latch assemblies that more reliably engage the target static feature within the operator cab, and which may be easily and conveniently released from the selective engagement with that static feature.

BRIEF SUMMARY

Disclosed herein are latch assemblies configured to releasably attach to a locking pin. The latch assemblies disclosed herein may, for example, be used to secure an adjustable window, such as may be used in a work vehicle, either in a deployed position or an undeployed position. Particularly, the latch assemblies disclosed herein may be released by a single user action, such as by pulling on a release lever. The latch assemblies disclosed herein may also include one or more features to improve the guidance of the locking pin into the latching assembly, and in some examples, to provide a backup or failsafe latch to prevent accidental disengagement of the latch assembly.

Certain examples concern a latch assembly for securing a window frame to a fixed housing. The latch assembly comprises a mounting plate configured to fixedly secure the latch assembly to the window frame and a primary locking plate mounted to the mounting plate. The primary locking plate includes a notch for receiving a locking pin. The primary locking plate is rotatable around a first hinge pin, and movable between an open position and a closed position by rotating about the first hinge pin. The latch assembly also comprises a secondary locking plate mounted to the mounting plate, rotatable around a second hinge pin, and movable between an undeflected position and a deflected position. The latch assembly also includes a release lever connected to the mounting plate and rotatable around a third hinge pin from an unlocked position to a locked position to prevent rotational movement of the primary locking plate. The secondary locking plate is configured to engage a locking pin mounted on the fixed housing. The primary locking plate is configured to rotate from the open position to the closed position when the locking pin is received in the notch. The primary locking plate is configured to secure the locking pin against the mounting plate, when the primary locking plate is in the closed position.

Certain examples concern a work vehicle comprising an operator cab having a fixed housing and a locking pin mounted to the fixed housing, a window; a latch assembly mounted to the window and configured to releasably secure the window to the housing of the operator cab. The latch assembly comprises a mounting plate having configured to fixedly secure the latch assembly to the window, a cover plate vertically spaced apart from the mounting plate and partially defining an enclosure between the cover plate and the mounting plate, first locking plate mounted to the mounting plate and rotatable around a first hinge pin between an open position and a closed position and including a notch configured to receive the locking pin, a second locking plate mounted to the mounting plate and rotatable around a second hinge pin between a deflected position and an undeflected position, a release lever mounted to the mounting plate and rotatable around a third hinge pin between a locked position and an unlocked position. When the notch of the first locking plate receives the locking pin, the first locking plate is urged by the locking pin from the open position to the closed position and the release lever engages the first locking plate to prevent the first locking plate from returning to the open position. When the locking pin is contained within the enclosure, and the second locking plate is in the undeflected position, the second locking plate prevents the locking pin from exiting the enclosure.

Numerous objects, features and advantages of the embodiments set forth herein will be readily apparent to those skilled in the art upon reading of the following disclosure when taken in conjunction with the accompanying drawings.

DETAILED DESCRIPTION

General Terms

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and compounds similar or equivalent to those described herein can be used in the practice or testing of the present disclosure, suitable methods and compounds are described below. The compounds, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

Introduction to the Disclosed Technology

Disclosed herein are aspects of latch assemblies for securing a window of a work vehicle, and examples of work vehicles including the same. The latch assemblies disclosed herein comprise one or more rotationally moving components configured to selectively engage with a static feature of the work vehicle.

In some examples, the window may be movable between two or more positions within an operator's cab. In such examples, when the latch engages the static feature of the work vehicle, the latch can retain the window in one or more of the possible positions. The latch assemblies disclosed herein may also include one or more features that improve the alignment of the latch assembly with the static feature, and can, in some examples, include a backup device to arrest inadvertent disengagement between the latch assembly and the static feature.

The latch assemblies disclosed herein may also be released from engagement with the static feature of the work vehicle by the simple actuation of a lever or other component that allows a user to release the latch assembly with one hand.

Aspects of the Disclosed Technology

Figure 1:
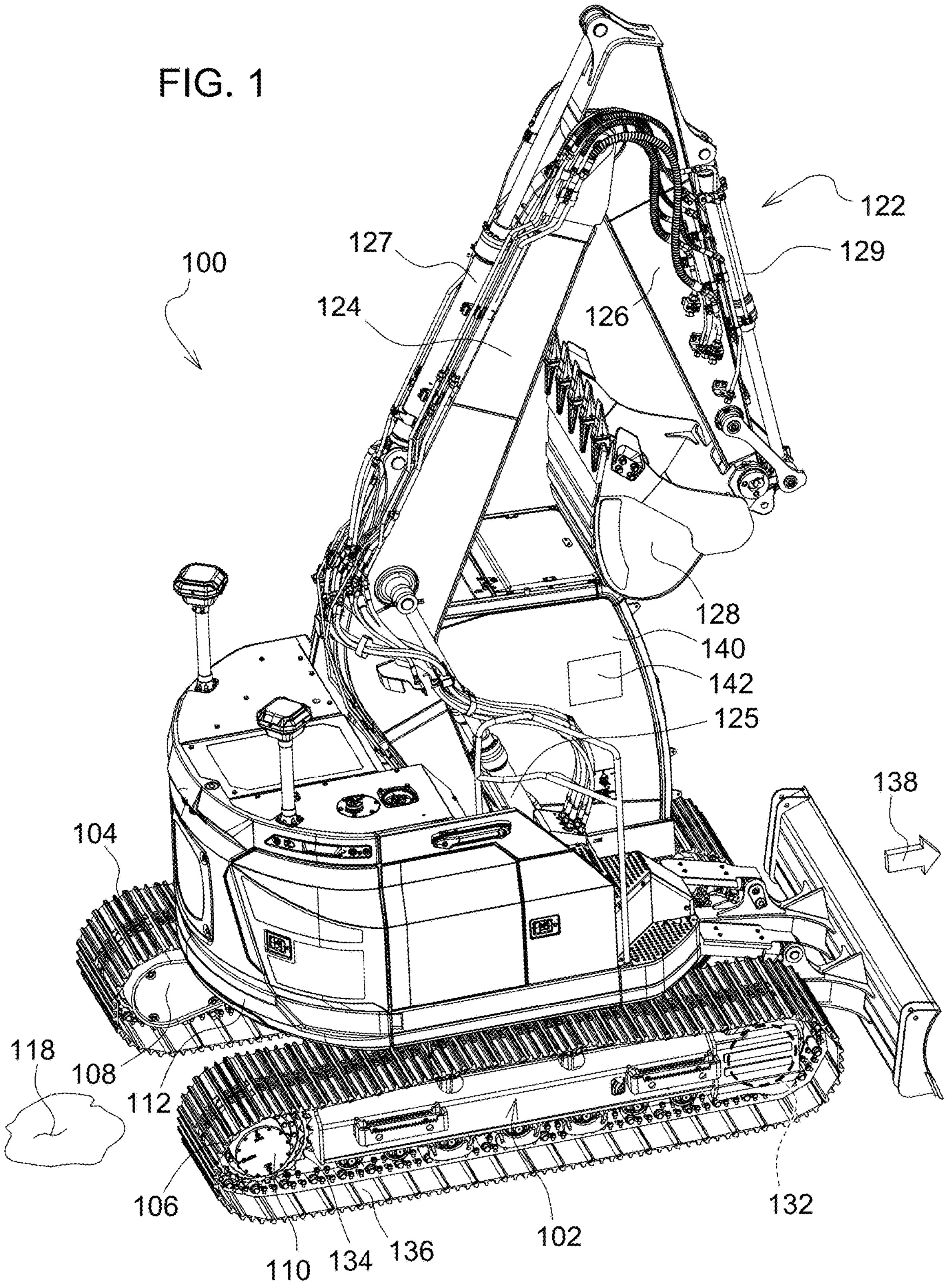
FIG. 1 is a perspective view of an electric excavator according to one aspect of the present disclosure.
Figure 2:
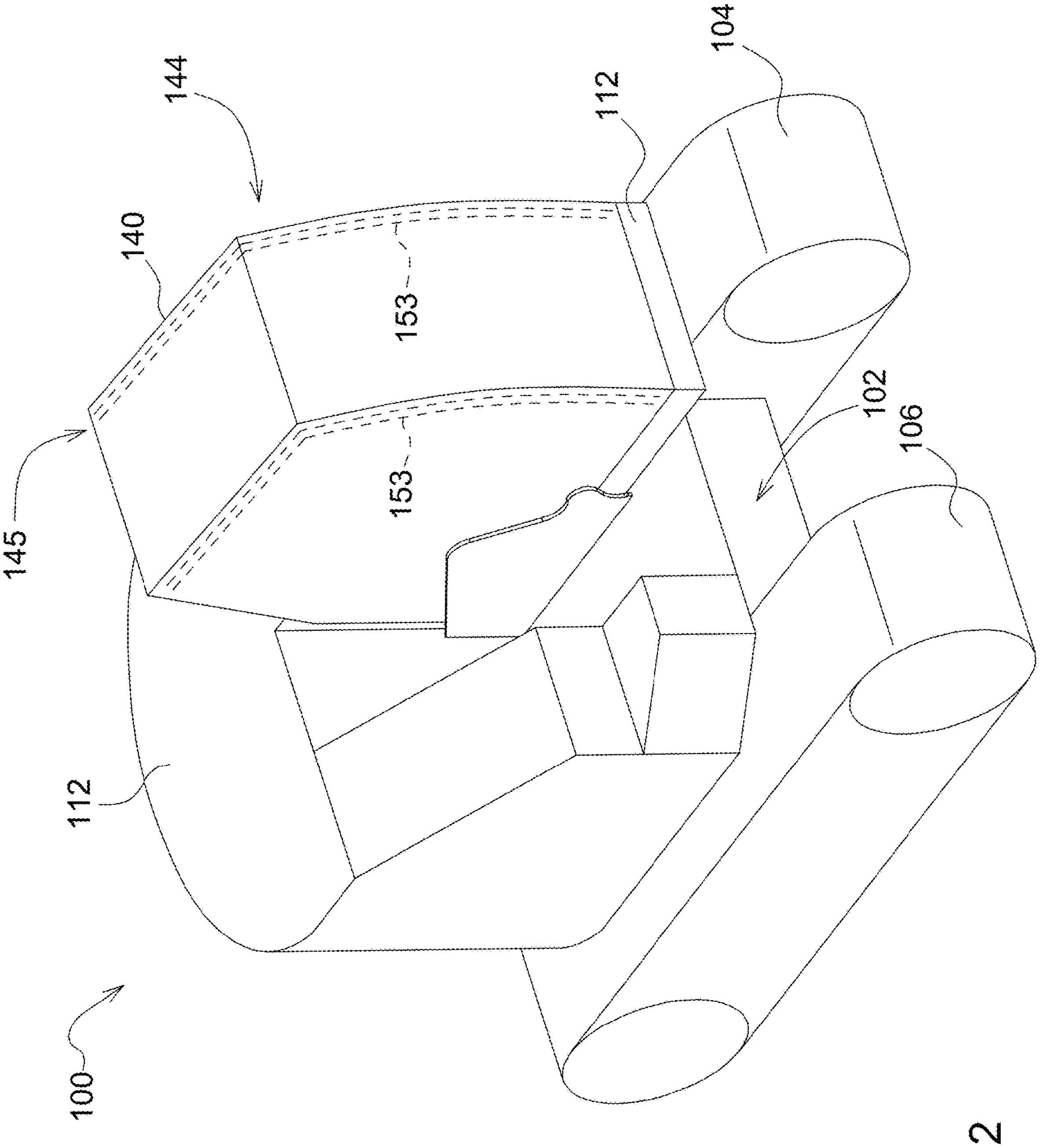
FIG. 2 is a schematic diagram of the cab, main frame, and tracks of an excavator according to one aspect of the present disclosure.

Referring now to the drawings and particularly to FIGS. 1 and 2, a work vehicle is shown and generally designated by the number 100. According to one aspect of the present disclosure, the work vehicle 100 can be a vehicle such as an excavator 100 as shown in FIG. 1, and it will be appreciated by those skilled in the art that the excavator 100 can be a hydraulic excavator or an electric excavator.

The excavator 100 includes an undercarriage 102 having first and second ground engaging units or crawler tracks 104 and 106 including first and second hydraulic travel motors 108 and 110 for driving the first and second ground engaging units 104 and 106, respectively.

As seen in FIG. 1, the main frame 112 is supported by the undercarriage 102. In some examples, the main frame 112 can be mounted to a swing bearing disposed between the main frame 112 and the undercarriage 102 such that the main frame 112 is pivotable about a pivot axis orthogonal to the undercarriage. The pivot axis is substantially vertical when a ground surface 118 engaged by the ground engaging units 104 and 106 is substantially horizontal. According to some examples, the excavator 100 can also include a hydraulic swing motor that pivots the main frame 112 on the swing bearing about the pivot axis relative to the undercarriage 102.

The swing bearing includes an upper ring configured to be bolted to the underside of the main frame 112, and a lower ring configured to be bolted to the undercarriage 102. The lower ring includes an internally toothed ring gear. The swing motor 120 is mounted on the main frame 112 and drives a pinion which results in pivoting movement of the main frame 112 on the swing bearing 114 about the pivot axis 116 relative to the undercarriage 102.

According to one aspect of the present disclosure, a boom assembly 122 extends forward from the main frame 112. The boom assembly 122 includes a boom 124, an arm 126 pivotally connected to the boom 124, and a working tool 128. Hydraulic actuators 125, 127 and 129 may control the articulated motion of the boom 124, arm 126 and working tool 128, respectively. The boom 124 is pivotally attached to the main frame 112 to pivot about a generally horizontal axis relative to the main frame 112. The working tool in this embodiment is an excavator shovel 128 which is pivotally connected to the arm 126.

In the embodiment of FIG. 1 the first and second ground engaging units 104 and 106 are left and right crawler tracks, respectively. Each of the tracked ground engaging units includes a front idler 132, a drive sprocket 134, and a track chain 136 extending around the front idler 132 and the drive sprocket 134. The travel motor 108 or 110 of each tracked ground engaging unit 104 or 106 drives its respective drive sprocket 134. Each tracked ground engaging unit has a forward traveling direction 138 defined from the drive sprocket 134 toward the front idler 132. The forward traveling direction 138 of the tracked ground engaging units also defines a forward traveling direction 138 of the undercarriage 102 and thus of the excavator 100.

Additional details about the work vehicles such as the excavator 100 disclosed herein can be found in U.S. patent application Ser. No. 18/626,037, the relevant portions of which are incorporated by reference herein.

A operator cab 140 may be located on the main frame 112, as illustrated in FIG. 2. The operator cab 140 and the boom assembly 122 may both be mounted on the main frame so that the operator cab 140 faces in a working direction of the boom assembly. A control station 62 may be located in the operator cab 140.

The operator cab 140 includes a window 142. In some examples, such as the one illustrated in FIG. 2, the window 142 may be positioned at a front end portion 144 of the operator cab 140, and in such cases is also a windscreen. The window 142 can comprise a transparent material, such as glass, plexiglass, carbonate, or any other suitable material, mounted in a window frame 146. The window frame 146, shown in greater detail in FIGS. 3A and 3B, comprises a pair of parallel or substantially parallel longitudinal members 148, and a pair of parallel or substantially parallel lateral members 150, extending between and oriented transverse to the longitudinal members 148.

According to one aspect of the present disclosure, the window frame 146 can also include a rolling caster 152 disposed laterally outwards of the longitudinal members 148 at each of the four corners 154 of the window frame 146. The rolling casters 152 may be received by tracks 153 internal to the operator cab 140, shown in FIG. 2.

Figure 3B:
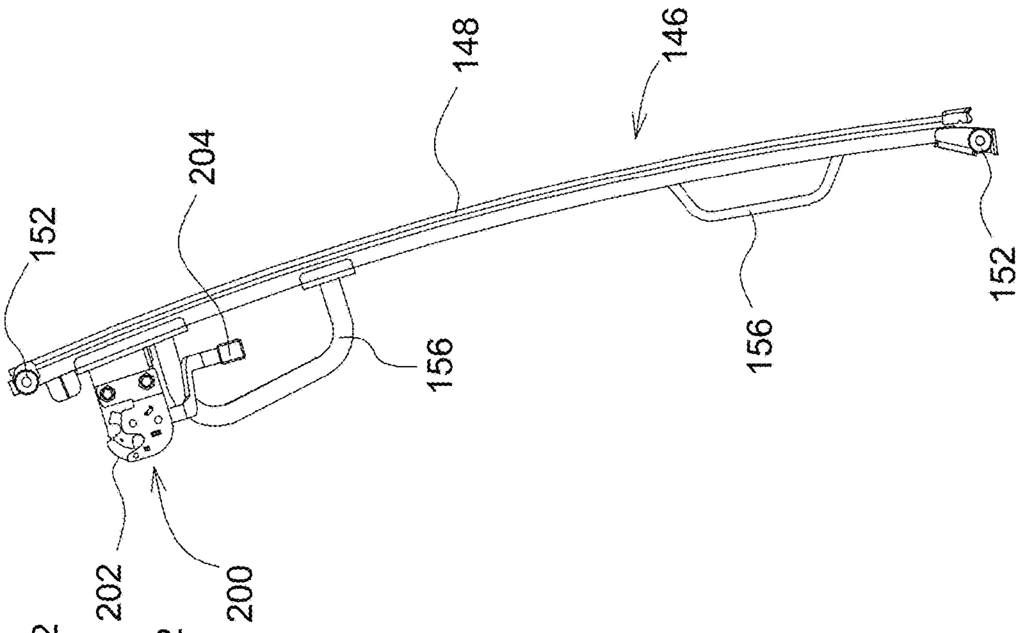
FIG. 3B is a side view of the window frame of FIG. 3A.
Figure 3A:
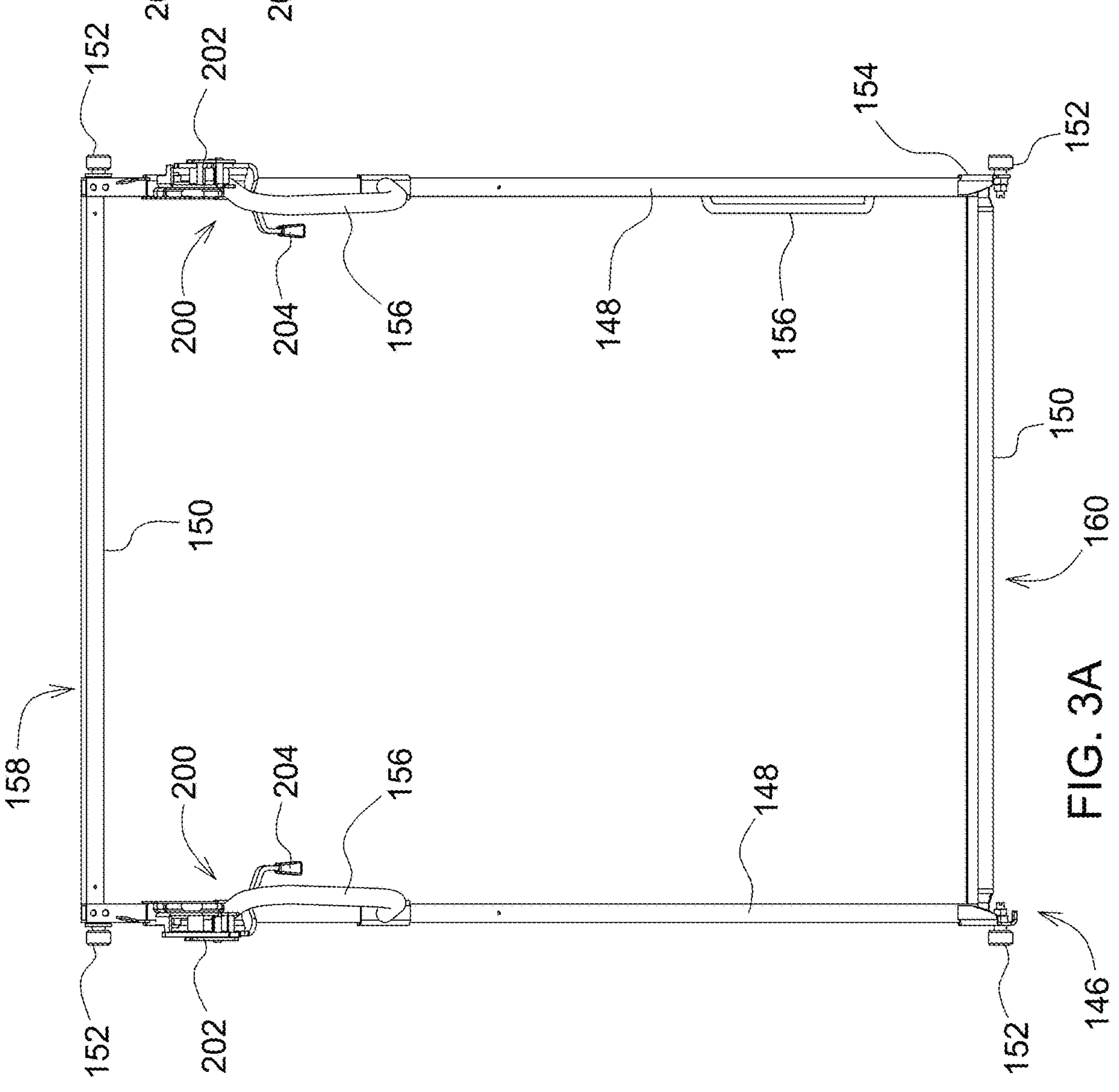
FIG. 3A is a front view of a window frame according to one aspect of the present disclosure.

The window frame 146 can also include one or more handles 156, which in some examples can be mounted to the longitudinal members 148, as shown in FIGS. 3A and 3B. In some examples, the one or more handles 156 can be positioned towards a top end portion 158 of the window frame 146. However, it is to be understood that, in other examples, the window frame 146 can include one or more handles 156 disposed towards a bottom end portion 160 of the frame in addition to or in lieu of the handles 156 disposed towards the top end portion 158 of the window frame 146.

According to one aspect of the present disclosure, the window 142 can be moved between a closed position, in which the window 142 is positioned in a forward and downward position to close off the front end portion 144 of the operator cab 140, and an open position, in which the window 142 is positioned rearwards and upwards, along an upper end portion 145 of the operator cab 140. According to some examples, to move the window 142 from the closed position to the open position, a vehicle operator may grab the window frame 146, for example, by any one of the one or more handles 156 attached to the window frame 146, and may urge the window frame 146, and thereby the window 142, to traverse the tracks 153 within the operator cab 140. This causes the rolling caster 152 to roll along the 153, and allows the window 142 to be moved within the operator cab 140.

As discussed further herein, the window frame 146 can also include one or more mechanisms to secure the window frame 146, and thereby the window 142 in either the open position or the closed position, and to thereby prevent the inadvertent movement of the window 142 from the open position to the closed position or vice versa when it is not desired that the window 142 be moved.

According to one aspect of the present disclosure, as illustrated in FIGS. 3A and 3B, a latch assembly 200 can be mounted to the window frame 146. The latch assembly 200 comprises a latch 202 and a release lever 204. As shown in FIGS. 3A and 3B, the latch assembly 200 can be mounted to the longitudinal members 148 near the top end portion 158 of the window frame 146, but it will be appreciated that in other examples, the latch assembly 200 can be mounted to the longitudinal members 148 at a different location, such as near the bottom end portion 160 of the window frame 146.

Figure 4A:
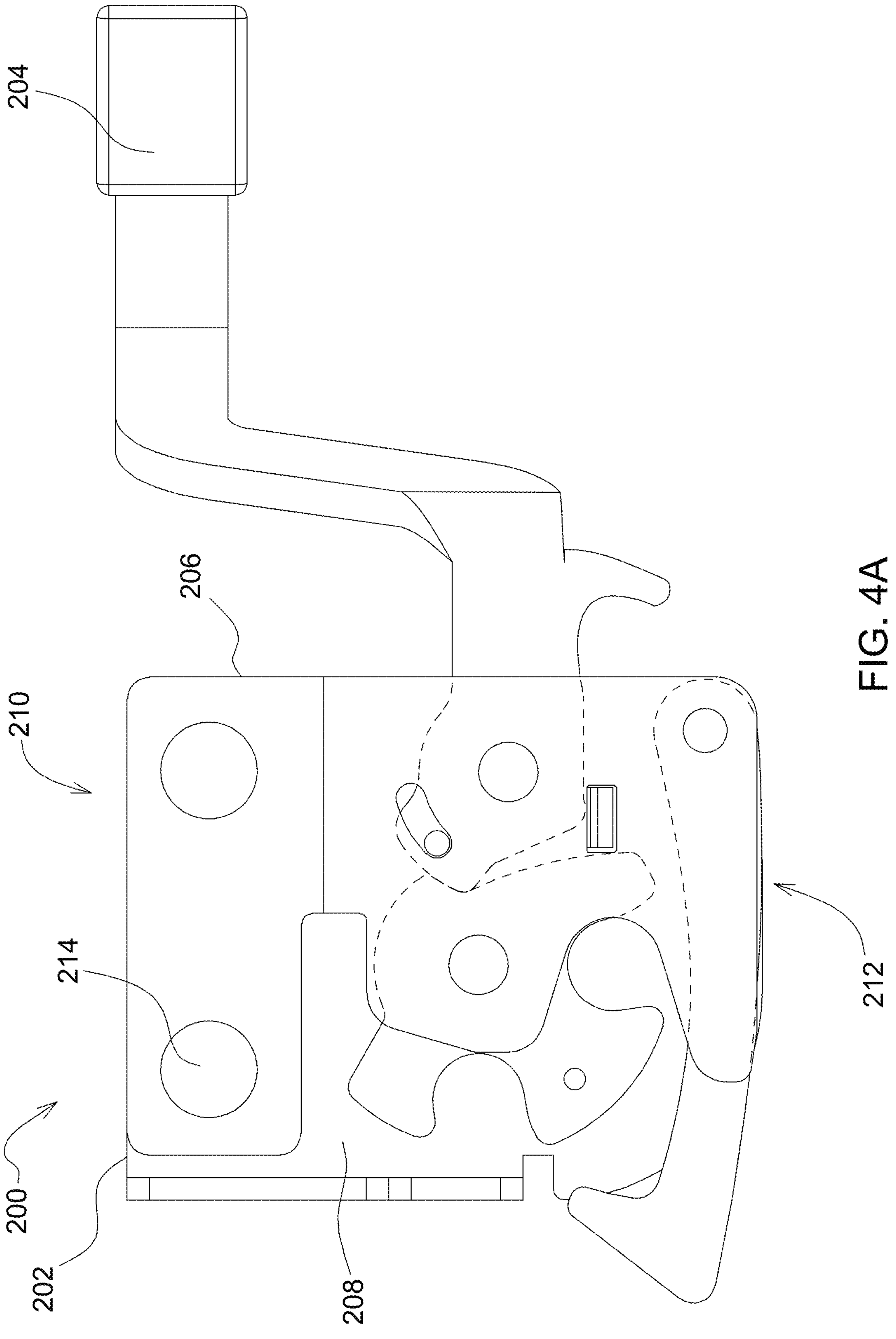
FIG. 4A is a schematic side view of a latch assembly according to one aspect of the present disclosure.

The latch assembly is shown in greater detail in FIGS. 4A-4D. According to one aspect of the present disclosure, the latch 202 of the latch assembly 200 comprises a mounting plate 206 and a cover plate 208 as shown in FIG. 4A. The mounting plate 206 and the cover plate 208 are connected at a top end portion 210 of the latch 202, but are laterally spaced apart from each other at a bottom end portion 212 of the latch 202. In some examples, one or more mounting holes 214. The mounting holes 214 can be sized to receive one or more bolts, screws, or pins, which secure the latch assembly 200, and particularly the latch 202 to the window frame 146.

Figure 4B:
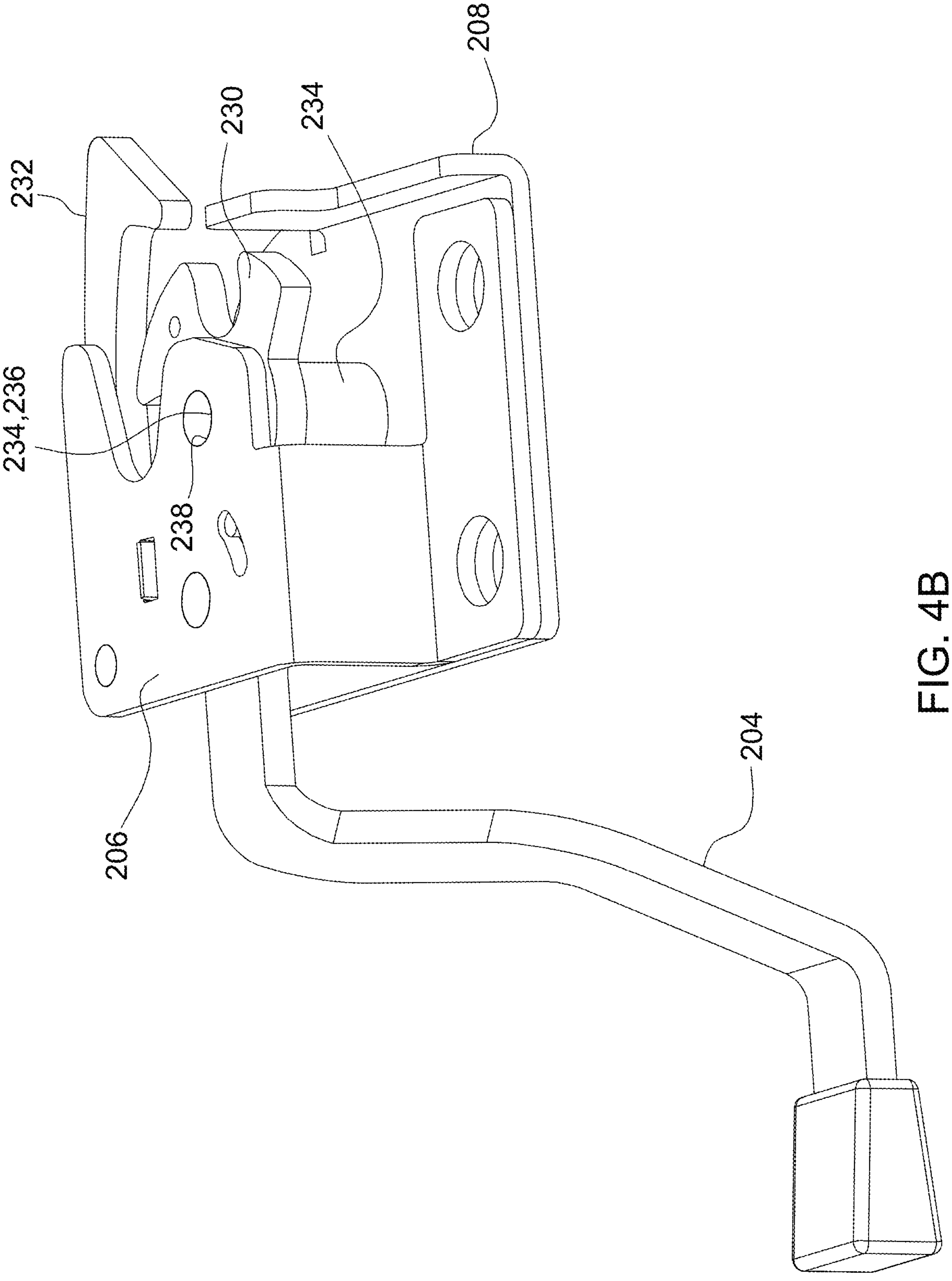
FIG. 4B is a perspective view of the latch assembly of FIG. 4A.
Figure 4C:
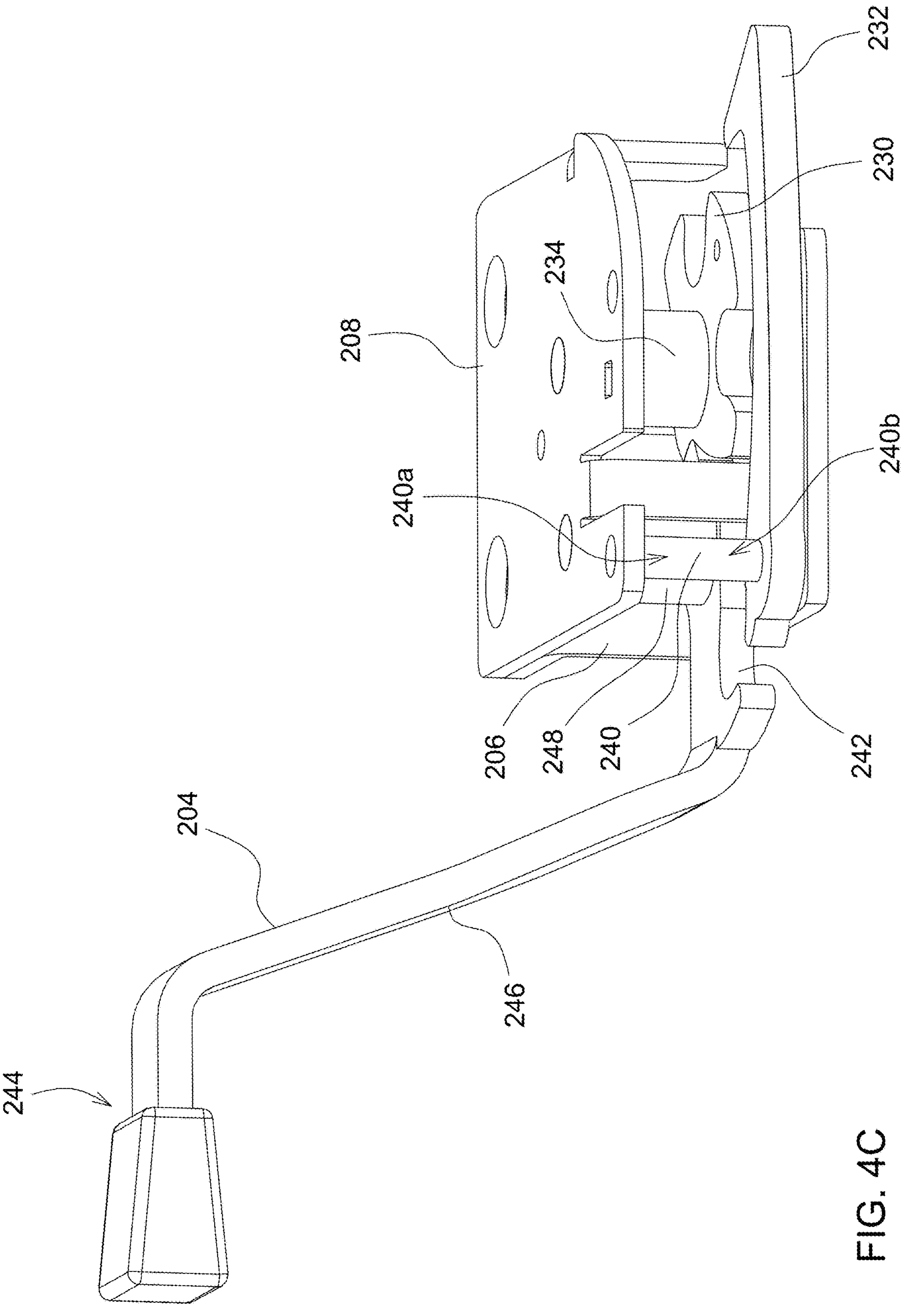
FIG. 4C is a perspective view of the latch assembly of FIG. 4A.
Figure 4D:
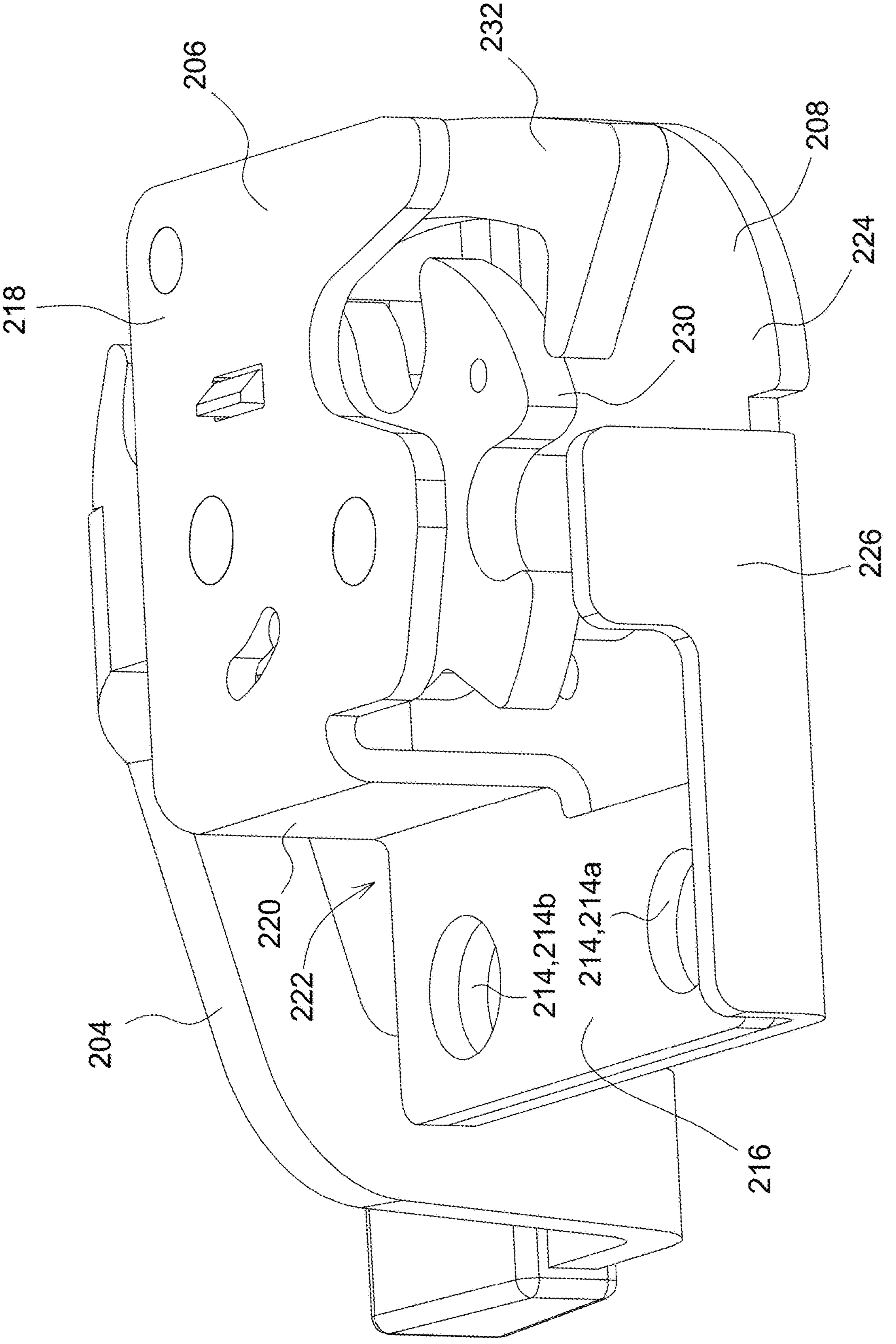
FIG. 4D is a perspective view of the latch assembly of FIG. 4A.

As shown in FIG. 4D, the mounting plate 206 can comprise a first vertical portion 216, a second vertical portion 218, and a horizontal portion 220 extending between and connecting the first vertical portion 216 and the second vertical portion 218. In some examples, the one or more mounting holes 214 in the mounting plate 206 are a one or more first mounting holes 214*a*, and are formed in the first vertical portion 216 of the mounting plate 206.

With continued reference to FIG. 4D, the cover plate 208 can comprise a vertically extending body 224 and a horizontally extending guard portion 226 projecting away from the vertically extending body 224. In some examples, the one or mounting holes 214 in the cover plate 208 are a one or more second mounting holes 214*b*, can be formed in the vertically extending body 224. In such examples, the one or more first mounting holes 214*a* and the one or more second mounting holes 214*b* can be aligned such that a bolt, screw, pin, or other hardware can extend through both a first mounting hole 214*a* and a second mounting hole 214, and thereby mount the latch 202 (and thus the latch assembly 200) to the window frame 146.

According to one aspect of the present disclosure, the first vertical portion 216 and the horizontal portion 220 of the mounting plate 206 can, according to one aspect of the present disclosure, define an internal angle 222. When the latch assembly 200 is mounted to the window frame 146, a member of the window frame 146, such as one of the longitudinal members 148 can be received in the internal angle 222 defined by the first vertical portion 216 and the horizontal portion 220.

In some examples, the mounting plate 206 and the cover plate 208 may be fixedly secured to each other by, for example, welding the mounting plate 206 to the cover plate 208 along the top end portion 210 of the latch 202. In some examples, the mounting plate 206 and the cover plate 208 may be secured to each other by any bolts, screws, or pins that extend through the one or more mounting holes 214 in the mounting plate 206 and the cover plate 208. It will be appreciated by those of skill in the art that these methods of attaching the mounting plate 206 to the cover plate 208 are not mutually exclusive, and the mounting plate 206 and cover plate 208 can be both welded together and compressively secured by the bolts, screws, or pins extending through the one or more mounting holes 214.

Turning now to FIGS. 4B and 4C, the latch 202 further includes one or more locking plates disposed between the mounting plate 206 and the cover plate 208. For example, in the aspect of the present disclosure shown in FIGS. 4B and 4C, the latch 202 includes a primary locking plate 230 (which in some examples, can be a pawl) and a secondary locking plate 232 (which may in examples may be configured as a locking hook) positioned between the mounting plate 206 and the cover plate 208.

As shown in FIG. 4B, the primary locking plate 230 can be attached to the mounting plate 206 and the cover plate 208 at least in part by a first hinge pin 234. As shown in FIG. 4B, the first hinge pin 234 can extend from the cover plate 208, with a narrowed head portion 236 which is received by a corresponding aperture 238 in the mounting plate 206, such that the first hinge pin 234 connects the mounting plate 206 and the cover plate 208. According to one aspect of the present disclosure an aperture in the primary locking plate 230 can also receive the narrowed head portion 236 of the first hinge pin 234, such that the primary locking plate 230 can be rotated around the first hinge pin 234. This enables the primary locking plate 230 to be moved between an open position and a closed position as discussed in greater detail below.

As shown in FIG. 4C, the secondary locking plate 232 can be attached to the mounting plate 206 and the cover plate 208 at least in part by a second hinge pin 240. The second hinge pin 240 can extend from the mounting plate 206 to the cover plate 208 such that the second hinge pin 240 further connects the mounting plate 206 and the cover plate 208. According to one aspect of the present disclosure, the second hinge pin 240 connects to the cover plate 208 at a first end portion 240*a*. In such examples, a second end portion 240*b* of the second hinge pin 240 extends through an aperture in the secondary locking plate 232 and attaches to the mounting plate 206. The secondary locking plate 232 can, in such examples, rotate around the second hinge pin 240, which enables the secondary locking plate 232 to be moved between a deflected position and an undeflected position, as discussed in greater detail below.

According to one aspect of the present disclosure, the release lever 204 includes a lock portion 242, which is positioned between the mounting plate 206 and the cover plate 208 of the latch 202, as shown in FIGS. 4A-4D. The release lever 204 also comprises a handle portion 244 and a lever arm 246 extending between the lock portion 242 and the handle portion 244.

As shown in FIG. 4C, the release lever 204 can be attached to the mounting plate 206 and the cover plate 208 at least in part by a third hinge pin 248. The third hinge pin 248 extends between the mounting plate 206 and the cover plate 208 such that the third hinge pin 248 further connects the mounting plate 206 and the cover plate 208. The third hinge pin 248 can extend through an aperture in a lock portion 242 of the release lever 204, such that the release lever 204 can rotate around the third hinge pin 248. This enables the release lever 204 to be moved between a locked position and an unlocked position, for example by a user pushing and/or pulling on the handle portion 244 of the release lever 204 to rotate the release lever 204 (and especially the lock portion 242) around the third hinge pin 248.

Figure 5A:
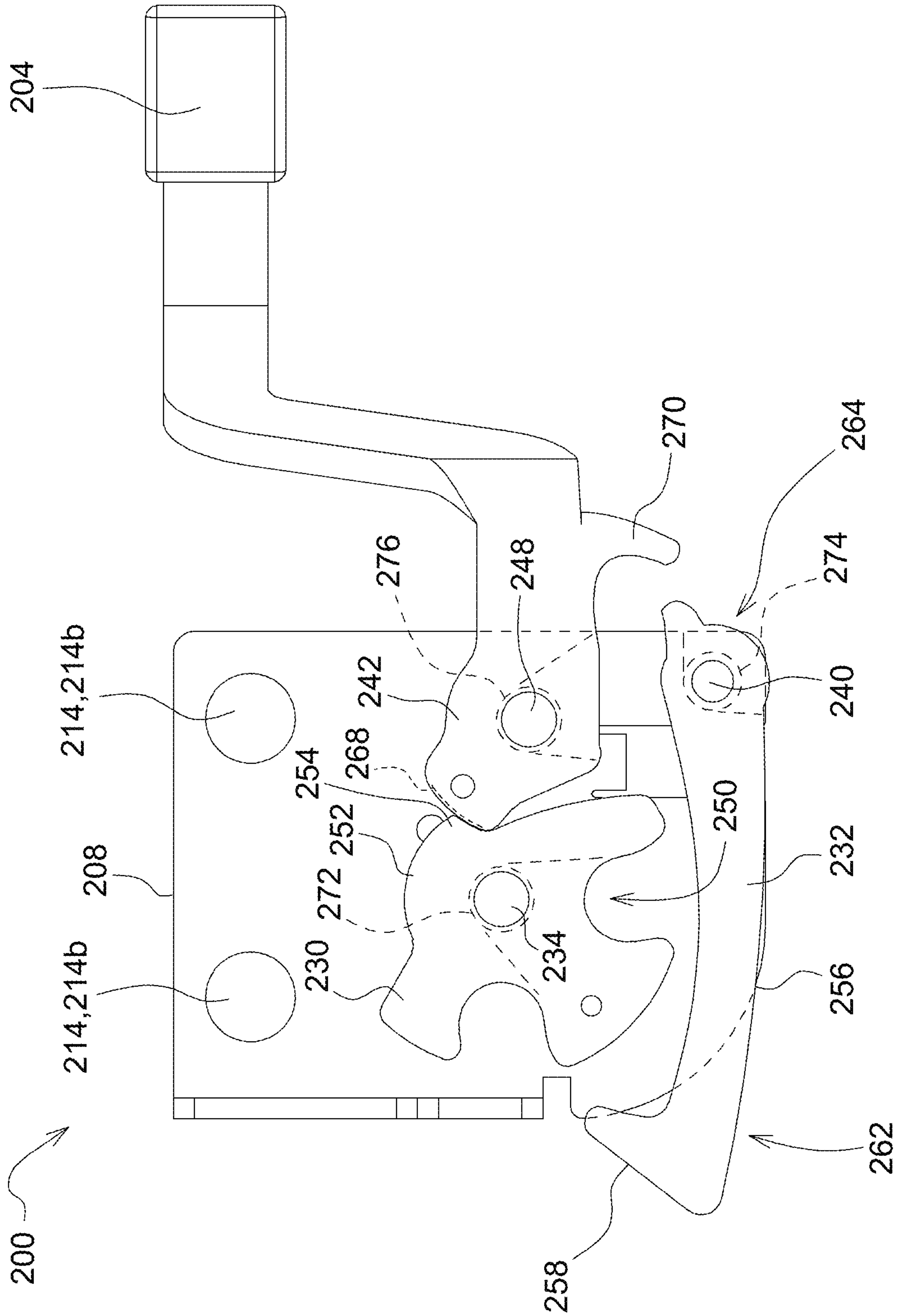
FIG. 5A is a side view of the internal components of latch assembly of FIGS. 4A-4B.
Figure 5B:
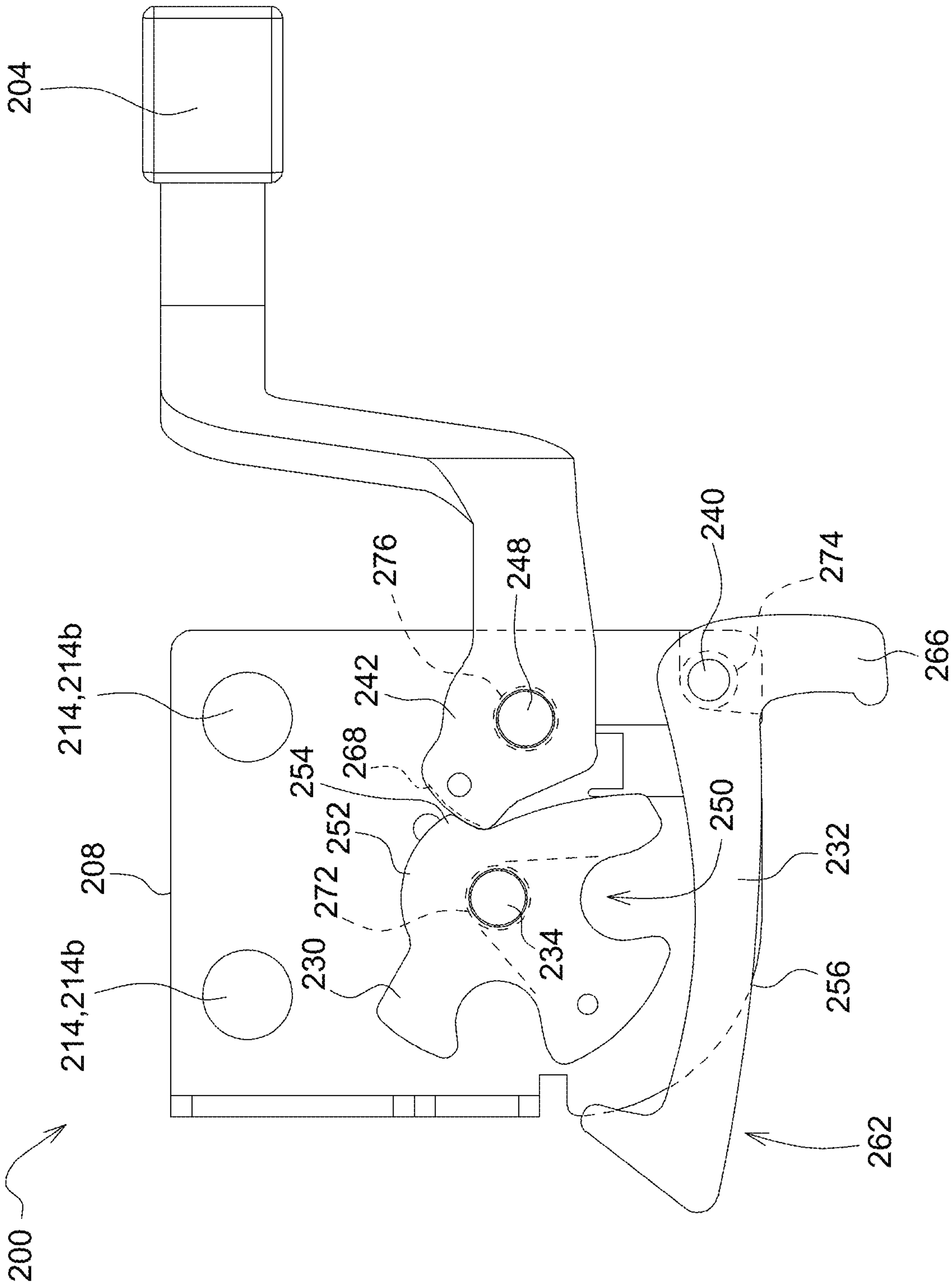
FIG. 5B is a side view of the internal components of a latch assembly according to another aspect of the present disclosure.

FIGS. 5A and 5B show the relative positioning of the release lever 204, the primary locking plate 230, and the secondary locking plate 232 with the mounting plate 206 removed for visual clarity.

As shown in FIGS. 5A and 5B, the primary locking plate 230 can, according to one aspect of the present disclosure, comprise a notch 250, radially spaced apart from the aperture that receives the first hinge pin 234. The notch 250 can be configured to receive and secure a pin, such as a locking pin projecting from a fixed housing of the operator cab 140, as is discussed further herein. The primary locking plate 230 can also include a cam portion 252 and a shoulder 254, which are radially spaced apart from the aperture that receives the first hinge pin 234 and circumferentially spaced apart from the notch 250.

As shown in FIGS. 5A and 5B, the secondary locking plate 232 can, according to one aspect of the present disclosure, comprise an arm portion 256, with a pin guide 258 positioned at a front end portion 262 of the arm portion 256 that is opposite from the aperture that receives the third hinge pin 248 of the secondary locking plate 232. The pin guide 258 can interact with, for example, a pin projecting from a fixed housing of the operator cab 140, such as the locking pin discussed in greater detail below. The secondary locking plate 232 can, according to one aspect of the present disclosure, be secured to the mounting plate 206 and the cover plate 208 at a rear end portion 264. The rear end portion 264 can engage with one or more of the other components of the latch 202, as is discussed in greater detail below.

According to one example, illustrated in FIG. 5B, the secondary locking plate 232 can also include a release lever 266, which allows a user to manually move the secondary locking plate 232 from the undeflected position to the deflected position. It will be appreciated that in other examples, the release lever 266 can be omitted in favor of one or more other features for moving the secondary locking plate 232 from the undeflected position to the deflected position.

With continued reference to FIGS. 5A and 5B, the lock portion 242 of the release lever 204 can comprise a locking ridge 268. The locking ridge 268 is disposed opposite to the handle portion 244 of the release lever 204, and is configured to engage with the cam portion 252 and the shoulder 254 to selectively prevent the primary locking plate 230 from returning from the closed configuration to the open configuration.

In some examples, such as that illustrated in FIG. 5A, the lock portion 242 of the release lever 204 can also include as release projection 270. The release projection 270 can extend away from the lock portion 242 at a location adjacent to the lever arm 246 of the release lever 204, and can be configured to selectively engage with the secondary locking plate 232 to move the secondary locking plate 232 from the undeflected position to the deflected position when a user moves the release lever 204 from the locked position to the unlocked position, as discussed in greater detail below. It will be appreciated that in other examples, the release projection 270 can be omitted in favor of one or more other features for moving the secondary locking plate 232 from the undeflected position to the deflected position, such as the release lever 266 previously introduced in relation to the example latch 202 shown in FIG. 5B.

The latch 202 can also include one or more biasing elements operationally connected to one or more of the primary locking plate 230, the secondary locking plate 232, and the release lever 204.

For example, as illustrated in FIGS. 5A and 5B, the latch 202 can include a first biasing element 272 operationally connected to the primary locking plate 230. The first biasing element 272 can be configured to resist the movement of the primary locking plate 230 from the open position to the closed position, and to urge the primary locking plate 230 from the closed position to the open position.

Likewise, as illustrated in FIGS. 5A and 5B, the latch 202 can include a second biasing element 274 operationally connected to the secondary locking plate 232. The second biasing element 274 can be configured to retain the secondary locking plate 232 in the undeflected position, and to resist the movement of the secondary locking plate 232 from the undeflected position to the deflected position. When no force remains to push the secondary locking plate 232 into the deflected position, the second biasing element 274 returns the secondary locking plate 232 to the undeflected position.

With continues reference to FIGS. 5A and 5B, the latch 202 can include a third biasing element 276 operationally connected to the release lever 204. The third biasing element 276 can be configured to return the release lever 204 from the unlocked position to the locked position. For example, when a user pulls the release lever 204 into the unlocked position, the third biasing element 276 opposes the movement of the release lever 204 and returns the release lever 204 to the locked position when the user releases the release lever 204.

It will be appreciated that, while FIGS. 5A and 5B show biasing elements 272, 274, and 276 that are torsion springs, other springs such as tension springs, compression springs may also be used, in a manner that will be readily understood by one of ordinary skill in the art. Additionally, in some examples, the biasing elements 272, 274, and 276 may be some other mechanically resilient structure designed to elastically deform in response to the movement of the primary locking plate 230, the secondary locking plate 232, or the release lever 204, and to resiliently return the primary locking plate 230, the secondary locking plate 232, or the release lever 204 to an original position.

The latch assembly 200 including the latch 202 disclosed herein can releasably secure the window frame 146 to a fixed housing of the operator cab 140.

Figure 6A:
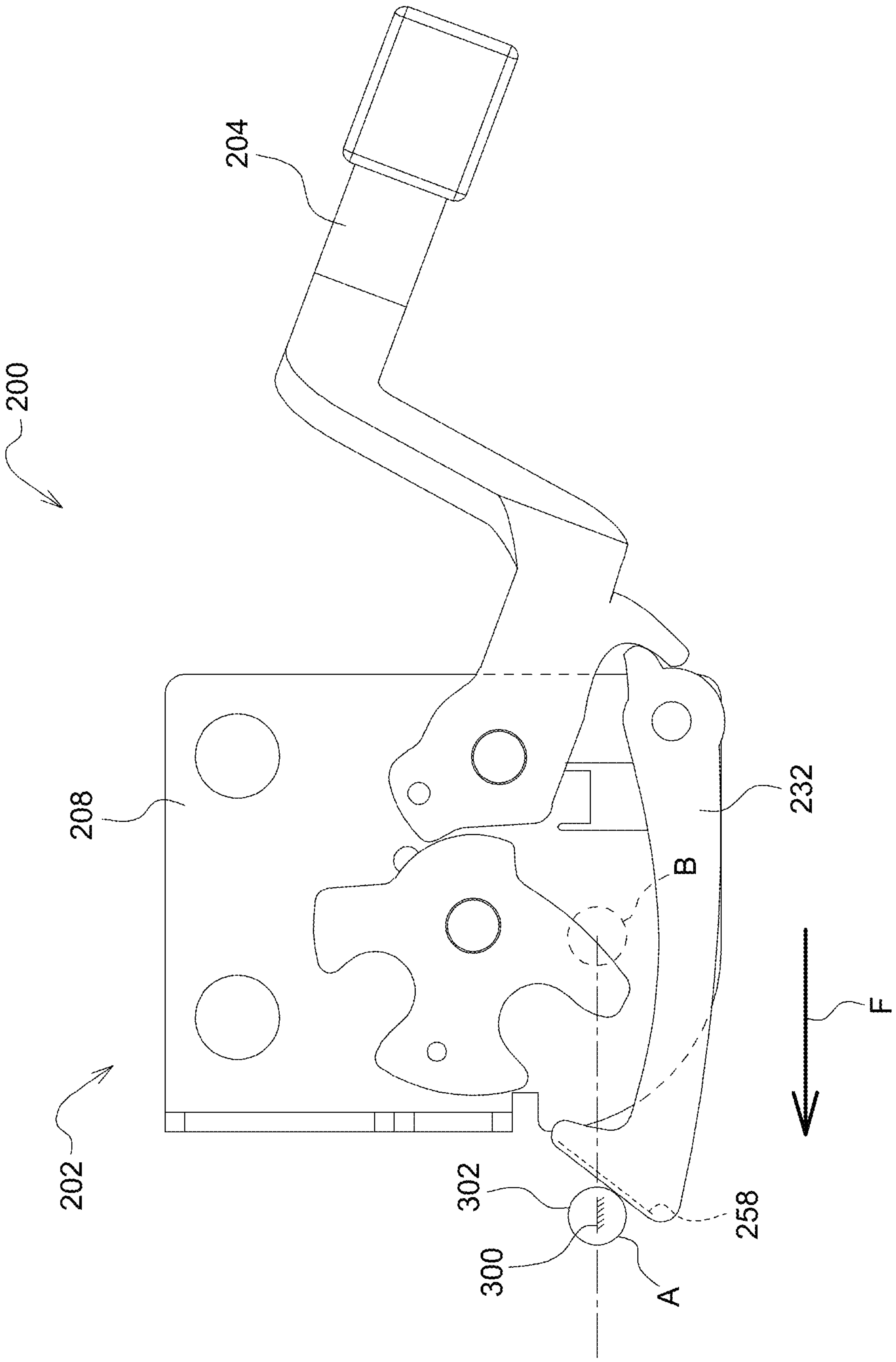
FIG. 6A is a side view illustrating the latch assembly of FIG. 4A engaging a locking pin.

According to one aspect of the present disclosure, shown in FIG. 6A, the latch 202 can engage with a feature permanently mounted to a fixed housing 300 of the operator cab 140. In some examples, the feature can be a locking pin 302, as shown in FIGS. 6A-6E, which together, illustrate the engagement and release of the latch 202 with the locking pin 302. The interior of the operator cab 140, and particularly the location of the locking pin 302 can be selected such that, as the window frame 146 is moved within the tracks 153, the latch 202 is guided into engagement with the locking pin 302. For improved clarity, the mounting plate 206 of the latch 202 is omitted from FIGS. 6A-6E.

As shown in FIG. 6A, as the latch assembly 200 is moved in the rearward direction indicated by the arrow F, the latch 202 admits and encloses the locking pin 302. That is, the latch 202 can move relative to the locking pin 302 such that the locking pin 302 is in an internal position B, relative to the enclosure formed by the cover plate 208 and the mounting plate 206 of the latch 202 rather than an external position, A.

As the latch assembly 200 moves in the direction, F, a leading edge portion of the pin guide 258 of the secondary locking plate 232 comes into contact with the locking pin 302.

Figure 6B:
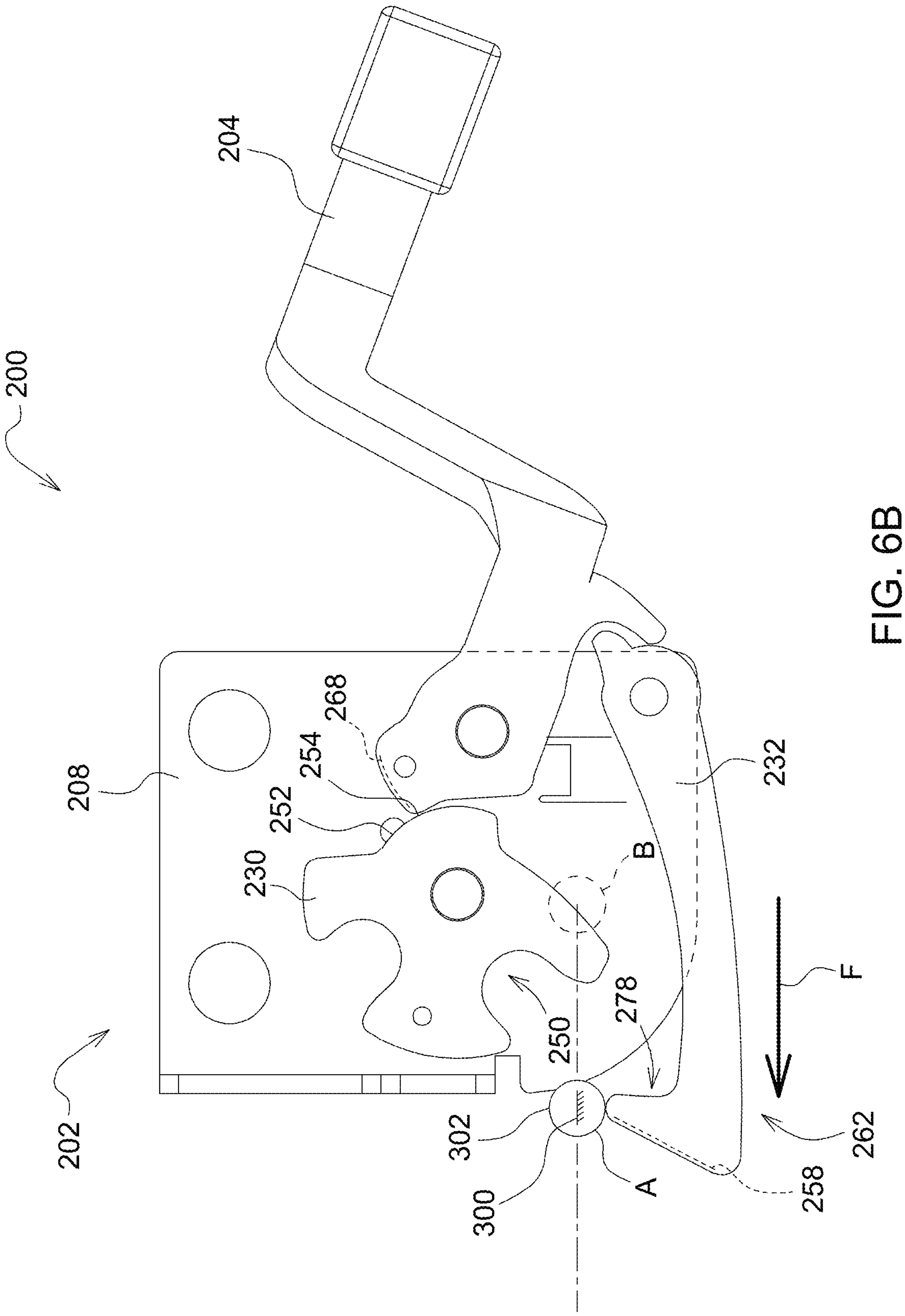
FIG. 6B is a side view illustrating the latch assembly of FIG. 6A as the locking pin progresses further into the latch assembly.

As the latch assembly 200 moves further in the direction, F, contact with the locking pin 302 moves the secondary locking plate 232 from the undeflected position to the deflected position, as shown in FIG. 6B, as the front end portion 262 of the secondary locking plate 232 moves downwards to accommodate the locking pin 302. In some examples, the movement of the secondary locking plate 232 from the undeflected position to the deflected position can be assisted by the user moving the release lever 204 from the locked position to the unlocked position, which causes the release projection 270 of the release lever 204 to engage with the rear end portion 264 of the secondary locking plate 232.

The engagement between pin guide 258 and the locking pin 302 allows the secondary locking plate 232 to deflect out of the way of the locking pin 302 such that, as the latch assembly 200 continues to move in the direction F, the locking pin 302 engage the notch 250 of the primary locking plate 230. The secondary locking plate is biased back to the undeflected position, such that the locking pin 302 is captured in the notch 250 of the primary locking plate 230. With the locking pin 302 received in the notch 250, further rearward movement of the latch assembly 200 causes the locking pin 302 to engage with the primary locking plate 230 at a side portion of the notch 250, which in turn causes the notch 250 to rotate around the first hinge pin 234 from the open position to the closed position.

Figure 6C:
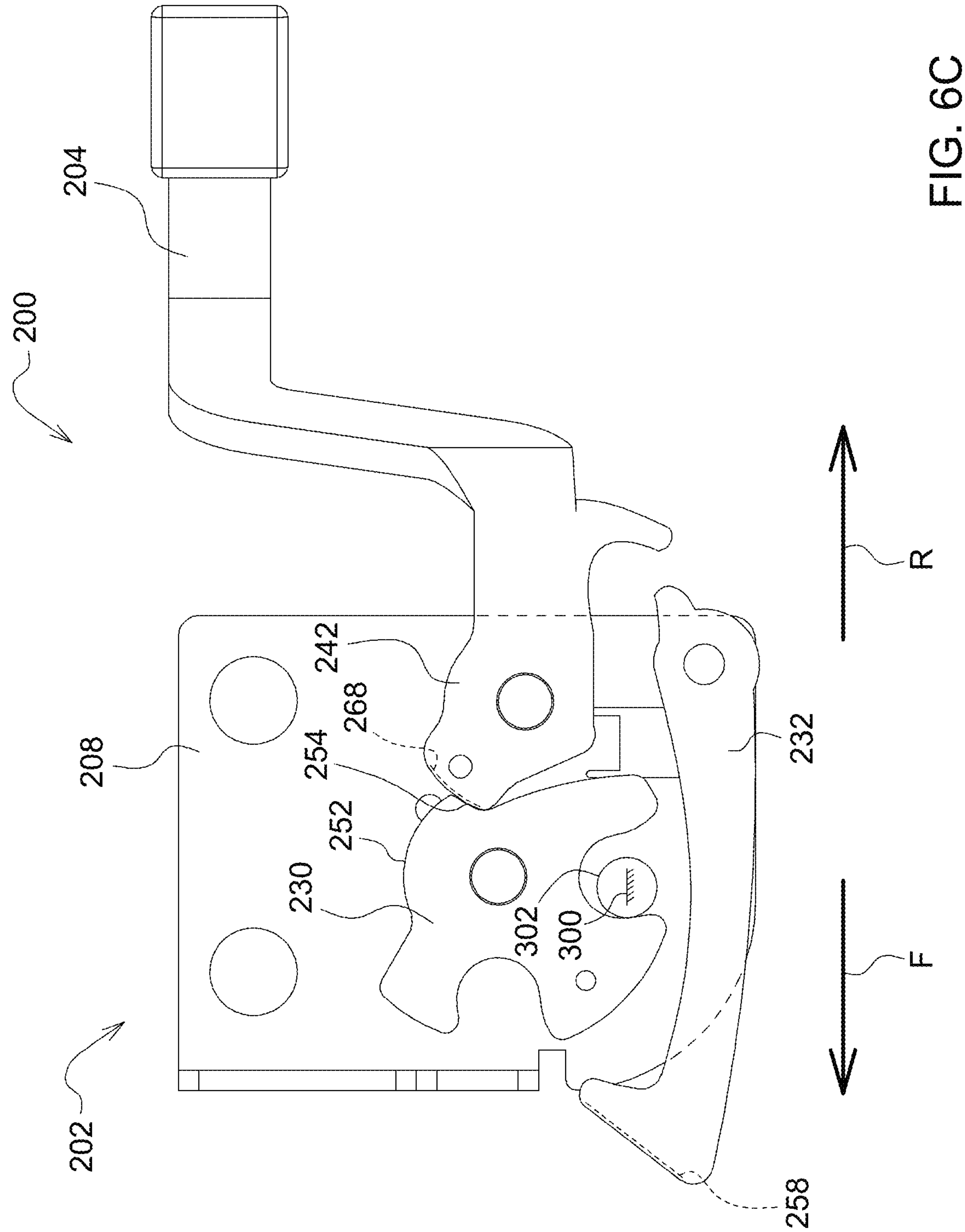
FIG. 6C is a side view illustrating the latch assembly of FIG. 6A with the locking pin fully inserted into the latch assembly.

As the primary locking plate 230 rotates from the open position to the closed position, the cam portion 252 of the primary locking plate moves rotationally against the locking ridge 268 of the release lever 204, until the shoulder 254 of the primary locking plate 230 clears the locking ridge 268. This allows the release lever 204 to return from the unlocked position to the locked position, which rotates the release lever 204 and causes the lock portion 242 of the release lever 204 to pivot (for example, downwards as illustrated in FIGS. 6A-6E) until the locking ridge 268 engages and locks with the shoulder 254 of the primary locking plate 230. In this arrangement, the engagement of the locking ridge 268 and the shoulder 254 prevents the primary locking plate 230 from rotating to move from the closed configuration until the closed configuration, until such a time as the user manipulates the release lever 204 to release the locking ridge 268 from the shoulder 254. This fully locked configuration of the latch assembly 200 is shown in FIG. 6C.

According to one aspect of the present disclosure, the secondary locking plate 232 can, when the latch assembly 200 is in the fully locked configuration, provide a backup latch. Specifically, if an external force (such as sudden impact or shock to the latch assembly 200) causes the locking pin 302 to become dislodged from the primary locking plate 230, the position and geometry of the secondary locking plate 232 can provide a backup latch 278 that will arrest the locking pin 302 before it fully exits the enclosure defined by the mounting plate 206 and the cover plate 208.

Figure 6D:
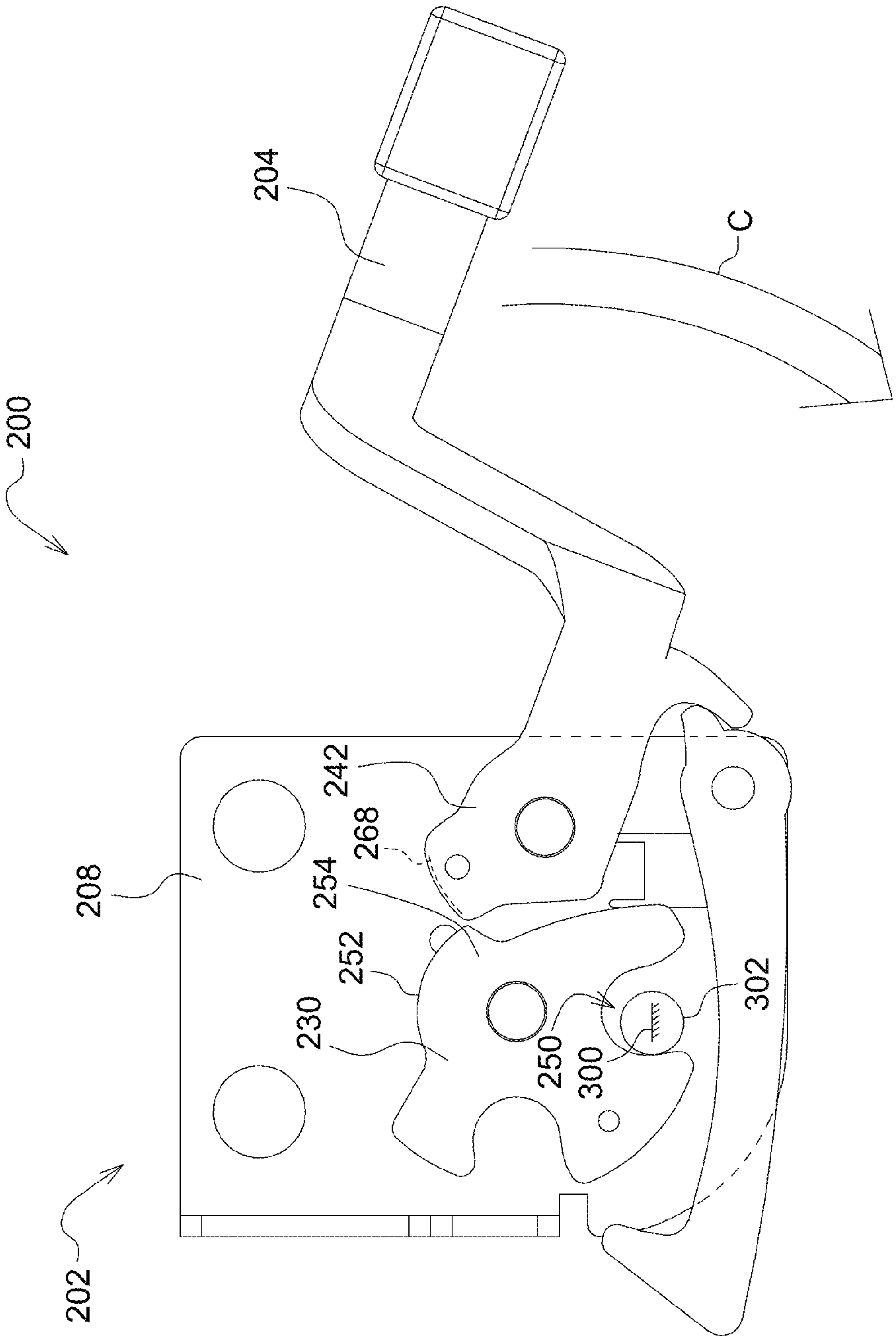
FIG. 6D is a side view illustrating an operation to begin releasing the locking pin from the latch assembly of FIG. 6A.
Figure 6E:
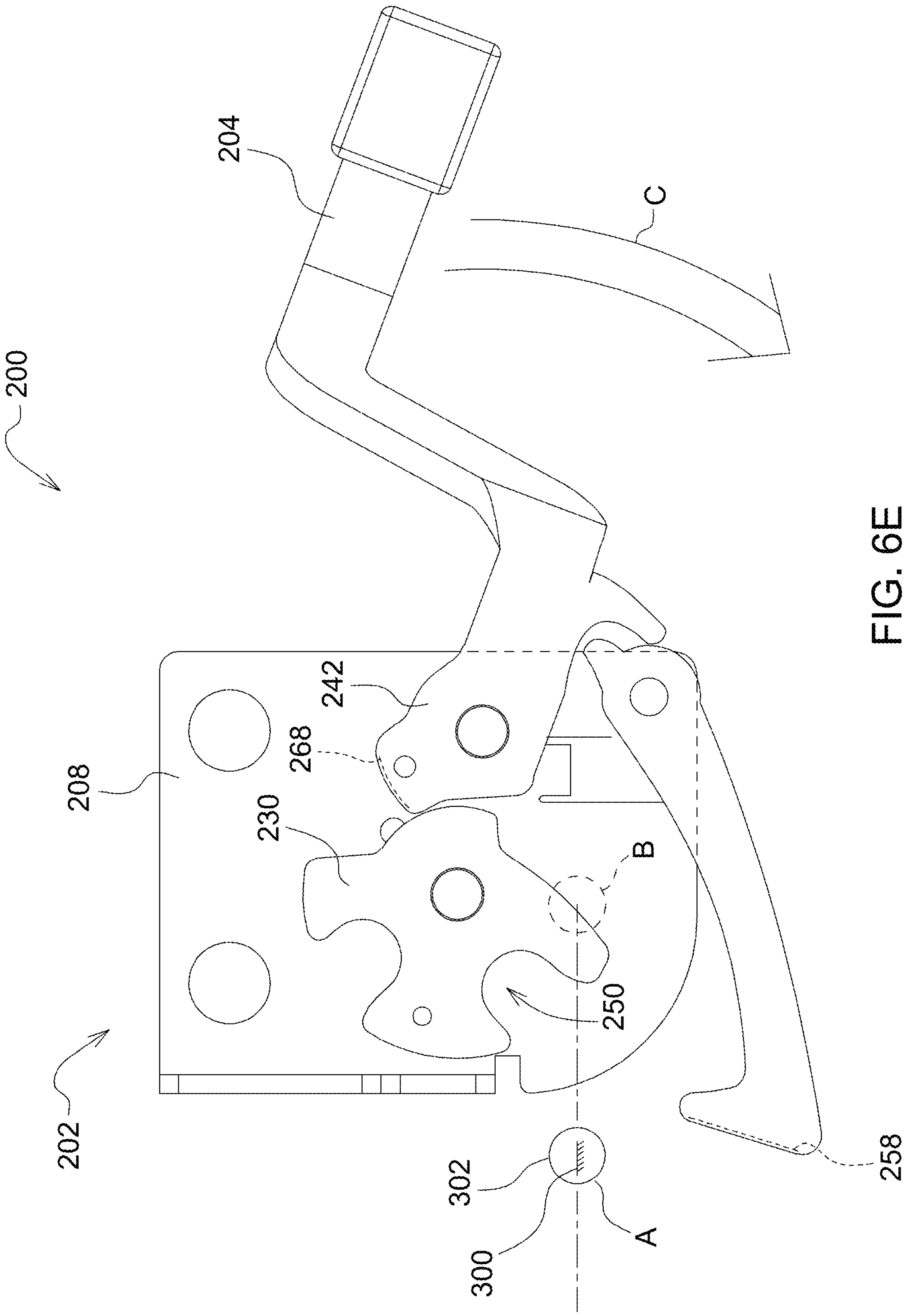
FIG. 6E is a side view illustrating the illustrating the fully releasing the locking in from the latch assembly of FIG. 6A.

To release the locking pin 302 from the latch 202, and thus to disengage the latch assembly 200 from the housing of the operator cab 140 and allow for the window 142 to be repositioned within the tracks 153, the user can pull on the release lever 204 and then push and/or pull the window frame 146 in the desired direction, as illustrated in FIGS. 6D and 6E.

Particularly, as shown in FIG. 6D, when a user pulls the release lever 204 in the direction C, indicated by the correspondingly labeled arrow, the lock portion 242 rotates accordingly. This causes the locking ridge 268 to pivot against the shoulder 254 of the primary locking plate 230 until the locking ridge 268 clears the shoulder 254 as shown in FIG. 6D. With the locking ridge 268 no longer locked with the shoulder 254, the primary locking plate 230 is able to rotate from the closed configuration to the open configuration, thereby releasing the locking pin 302 from the primary locking plate 230. In some examples, the rotation of the primary locking plate 230 from the closed configuration to the open configuration can be performed or assisted by a biasing element, such as the first biasing element 272 previously discussed. In some examples, the user may cause or partially cause the rotation of the primary locking plate 230 from the closed configuration to the open configuration by pushing the frame in the desired direction, and causing the locking pin 302 to engage with the notch 250 of the primary locking plate 230, and thereby causing the primary locking plate 230 to rotate from the closed configuration to the open configuration.

According to one aspect of the present disclosure, when the user moves the release lever 204 in the direction C, the release projection 270 can engage the rear end portion 264 to move the secondary locking plate 232 from the undeflected position to the deflected position, as illustrated in FIG. 6E. With the secondary locking plate 232 in the deflected position and the primary locking plate 230 in the open position as shown, the locking pin 302 can exit the enclosure of the latch 202 defined by the mounting plate 206 and the cover plate 208. That is, the latch 202 can move relative to the locking pin 302 such that the locking pin 302 is in the external position A, relative to the latch 202 rather than the internal position B, relative to the latch 202.

It will be appreciated that, in examples where the secondary locking plate 232 includes a release lever 266, the secondary locking plate 232 may be moved from the undeflected position to the deflected position by the user pulling on the release lever 266, instead of by the user moving the release lever 204 from the locked position to the unlocked position. Thus, in such a configuration, the release lever 204 may be moved from the locked position to the unlocked position to disengage the locking ridge 268 from the shoulder 254, and afterwards, can move the secondary locking plate 232 from the undeflected position to the deflected position by pulling on the release lever 266

With the locking pin 302 in the external position A, the latch assembly latch assembly 200 is thus disconnected from the fixed housing 300 of the operator cab 140, and can be moved within the operator cab 140, for example, by moving the window frame 146 along the tracks 153.

Advantageously, the combination of features disclosed herein provides an improved latch assembly 200, which offers improved alignment between the latch assembly 200 and the 402, and which provides a backup latch to prevent inadvertent detachment of the latch assembly 200 from the locking pin 302. Such latch assemblies 200 may be more easily secured to the locking pin 302, and are less likely to come loose to allow the window 142 to change position when it is not desired that the window 142 change position. Moreover, according to some aspects of the present disclosure, the latch assembly 200 can be released from the locking pin 302 with a single actuation of a lever, such as the release lever 204, allowing for the position of the window 142 to be more easily changed by a user.

What is claimed is:

1. A latch assembly for securing a window frame to a fixed housing comprising:

a mounting plate configured to fixedly secure the latch assembly to the window frame;

a primary locking plate mounted to the mounting plate, including a notch for receiving a locking pin, wherein the primary locking plate is rotatable around a first hinge pin, and movable between an open position and a closed position by rotating about the first hinge pin;

a secondary locking plate mounted to the mounting plate, rotatable around a second hinge pin, and movable between an undeflected position and a deflected position;

a release lever connected to the mounting plate and rotatable around a third hinge pin from an unlocked position to a locked position to prevent rotational movement of the primary locking plate;

wherein the secondary locking plate is configured to engage the locking pin mounted on the fixed housing, wherein the secondary locking plate, in the undeflected position, is positioned to arrest the locking pin and prevent the locking pin from exiting the latch assembly when the primary locking plate is in the open position, wherein the primary locking plate is configured to rotate from the open position to the closed position when the locking pin is received in the notch, and wherein the primary locking plate is configured to secure the locking pin against the mounting plate, when the primary locking plate is in the closed position.

2. The latch assembly of claim 1, wherein the secondary locking plate comprises an arm, a pin guide disposed at a front end portion of the arm, and a shoulder disposed at a rear end portion of the arm.

3. The latch assembly of claim 2, further comprising a biasing element attached to the secondary locking plate and configured to retain the secondary locking plate in the undeflected position.

4. The latch assembly of claim 2, further comprising a cover plate enclosing the primary locking plate and the secondary locking plate, wherein when the secondary locking plate is in the undeflected position and the locking pin is received in the latch assembly, the secondary locking plate is configured to prevent the locking pin from exiting an enclosure defined by the mounting plate, the secondary locking plate, and the cover plate.

5. The latch assembly of claim 2, wherein the release lever engages the shoulder of the secondary locking plate to move the secondary locking plate from the undeflected position to the deflected position.

6. The latch assembly of claim 5, wherein when the secondary locking plate is in the deflected position, the locking pin can exit the latch assembly.

7. The latch assembly of claim 1, wherein the primary locking plate comprises a shoulder circumferentially spaced apart from the notch.

8. The latch assembly of claim 7, wherein when the release lever is in the locked position, the release lever engages the shoulder of the primary locking plate to prevent the primary locking plate from moving from the closed position to the open position.

9. The latch assembly of claim 8, wherein when the release lever is moved from the locked position to the unlocked position, the release lever disengages the shoulder of the primary locking plate to permit the primary locking plate to move from the closed position to the open position.

10. The latch assembly of claim 1 further comprising a biasing element operationally connected to the release lever and configured to return the locking lever from the unlocked position to the locked position.

11. The latch assembly of claim 1, wherein the primary locking plate comprises a cam portion that engages the release lever and prevents the release lever from moving from the unlocked position to the locked position when the primary locking plate is in the open position.

12. The latch assembly of claim 1, wherein when the locking pin is received in the notch of the primary locking plate, the locking pin engages a side portion of the notch of the locking plate to rotationally move the primary locking plate from the open position to the closed position.

13. The latch assembly of claim 1, further comprising a biasing element operationally attached to the primary locking plate and configured to return the primary locking plate to the open position.

14. The latch assembly of claim 1, wherein moving the release lever from the locked position to the unlocked position both releases the primary locking plate to return to the open position and moves the secondary locking plate from the undeflected position to the deflected position.

15. A work vehicle comprising:

an operator cab having a fixed housing and a locking pin mounted to the fixed housing;

a window; and a latch assembly mounted to the window and configured to releasably secure the window to the housing of the operator cab, the latch assembly comprising:

a mounting plate configured to fixedly secure the latch assembly to the window;

a cover plate vertically spaced apart from the mounting plate and partially defining an enclosure between the cover plate and the mounting plate;

a first locking plate mounted to the mounting plate and rotatable around a first hinge pin between an open position and a closed position and including a notch configured to receive the locking pin;

a second locking plate mounted to the mounting plate and rotatable around a second hinge pin between a deflected position and an undeflected position; and a release lever mounted to the mounting plate and rotatable around a third hinge pin between a locked position and an unlocked position;

wherein when the notch of the first locking plate receives the locking pin, the first locking plate is urged by the locking pin from the open position to the closed position and the release lever engages the first locking plate to prevent the first locking plate from returning to the open position, wherein when the locking pin is contained within the enclosure, and the second locking plate is in the undeflected position, the second locking plate prevents the locking pin from exiting the enclosure, and wherein a leading edge portion of the second locking plate engages the locking pin prior to the locking pin being received in the notch of the first locking plate.

16. The work vehicle of claim 15, further comprising:

a first biasing element operatively connected to the first locking plate and configured to return the first locking plate from the closed position to the open position;

a second biasing element operatively connected to the second locking plate and configured to return the second locking plate from the deflected position to the undeflected position; and a third biasing element operatively connected to the release lever and configured to return the release lever from the unlocked position to the locked position.

17. The work vehicle of claim 15, wherein the second locking plate comprises the leading edge portion, and when the locking pin is introduced into the enclosure, the locking pin engages the leading edge portion of the second locking plate to urge the second locking plate from the undeflected position to the deflected position.

18. The work vehicle of claim 15, wherein the first locking plate comprises a cam portion that engages the release lever and prevents the release lever from entering the locked position when the first locking plate is in the open position.

19. The work vehicle of claim 15, wherein when a user moves the release lever from the locked position to the unlocked position, the release lever:

disengages the first locking plate, allowing the first locking plate to return from the locked position to the unlocked position, and engages the second locking plate, urging the second locking plate from the undeflected position to the deflected position.

20. A latch assembly for securing a window frame to a fixed housing comprising:

a mounting plate configured to fixedly secure the latch assembly to the window frame;

a primary locking plate mounted to the mounting plate, including a notch for receiving a locking pin, wherein the primary locking plate is rotatable around a first hinge pin, and movable between an open position and a closed position by rotating about the first hinge pin;

a secondary locking plate mounted to the mounting plate, rotatable around a second hinge pin, and movable between an undeflected position and a deflected position;

a release lever connected to the mounting plate and rotatable around a third hinge pin from an unlocked position to a locked position to prevent rotational movement of the primary locking plate;

wherein the secondary locking plate is configured to engage the locking pin mounted on the fixed housing;

wherein the primary locking plate is configured to rotate from the open position to the closed position when the locking pin is received in the notch;

wherein the primary locking plate is configured to secure the locking pin against the mounting plate, when the primary locking plate is in the closed position;

wherein the secondary locking plate comprises an arm, a pin guide disposed at a front end portion of the arm, and a shoulder disposed at a rear end portion of the arm; and wherein a leading edge of the pin guide of the secondary locking plate engages the locking pin prior to the locking pin engaging the notch of the primary locking plate, and wherein the secondary locking plate is moved from the undeflected position to the deflected position to admit the locking pin into the latch assembly.

* * * * *